(12) United States Patent
Nelson, Sr.

(10) Patent No.: US 9,383,111 B2
(45) Date of Patent: Jul. 5, 2016

(54) PROPANE SWIVEL BURNER

(71) Applicant: Adam Royce Nelson, Sr., New Orleans, LA (US)

(72) Inventor: Adam Royce Nelson, Sr., New Orleans, LA (US)

(*) Notice: Subject to any disclaimer, the term of this patent is extended or adjusted under 35 U.S.C. 154(b) by 302 days.

(21) Appl. No.: 13/908,478

(22) Filed: Jun. 3, 2013

(65) Prior Publication Data
US 2014/0352681 A1    Dec. 4, 2014

(51) Int. Cl.
*F24C 3/14* (2006.01)
*A47J 36/26* (2006.01)

(52) U.S. Cl.
CPC ... *F24C 3/14* (2013.01); *A47J 36/26* (2013.01)

(58) Field of Classification Search
CPC .............. F24C 1/16; F24C 3/14; A47J 33/00
USPC .............. 126/9 B, 9 R, 29, 38, 152 R, 152 B
See application file for complete search history.

(56) References Cited

U.S. PATENT DOCUMENTS

| | | | | |
|---|---|---|---|---|
| 166,767 A | * | 8/1875 | Gorham | 126/38 |
| 1,319,322 A | * | 10/1919 | Berglann | 126/24 |
| 1,480,585 A | * | 1/1924 | Wilkie | 126/214 C |
| 1,564,602 A | * | 12/1925 | Bruno Martin | 126/215 |
| 1,879,837 A | * | 9/1932 | Bierlich | 126/43 |
| D229,275 S | * | 11/1973 | Delahoussaye | D7/337 |
| 4,092,974 A | * | 6/1978 | Zenzaburo | 126/38 |
| 4,177,790 A | * | 12/1979 | Zenzaburo | 126/38 |
| 4,454,859 A | * | 6/1984 | Vincent | 126/38 |
| 4,532,910 A | * | 8/1985 | Longley, Jr. | 126/9 B |
| 4,653,462 A | * | 3/1987 | DeFoe | 126/24 |
| 4,726,350 A | * | 2/1988 | Steinhauser | 126/38 |
| 4,776,318 A | * | 10/1988 | Serra et al. | 126/38 |
| 5,117,808 A | * | 6/1992 | Peters et al. | 126/260 |
| D364,534 S | * | 11/1995 | Brown et al. | D7/407 |
| D375,223 S | * | 11/1996 | Parnell et al. | D7/337 |
| 5,884,553 A | * | 3/1999 | Morris | 99/337 |
| 6,102,027 A | * | 8/2000 | Tilby | 126/38 |
| D453,372 S | * | 2/2002 | Pecoskie | D23/332 |
| 6,851,419 B2 | * | 2/2005 | Reiner | 126/9 B |
| 7,775,203 B1 | * | 8/2010 | Patrick | 126/38 |
| 2008/0029082 A1 | * | 2/2008 | Dowst et al. | 126/9 B |
| 2009/0280447 A1 | * | 11/2009 | Long | 431/123 |
| 2014/0209083 A1 | * | 7/2014 | Young | 126/30 |
| 2014/0238385 A1 | * | 8/2014 | Smith et al. | 126/39 E |

* cited by examiner

Primary Examiner — Jorge Pereiro

(57) ABSTRACT

The present invention relates to a propane swivel burner which is comprised of a pair swivel legs and a leg that is stationary making the burner portable, a hinge that offer durability and stability to the legs of the burner, a grill/grid that provides safety a slot that will allow cooking pot the ability to set atop of the burner more safely, a foot stand on the bottom of each leg to make the burner more stable, a cylinder pipe to house the gas line and directs the flame, and a level that will allow a variety in sizes of cooking pans and/or pots to set atop the propane swivel propane burner.

2 Claims, 5 Drawing Sheets

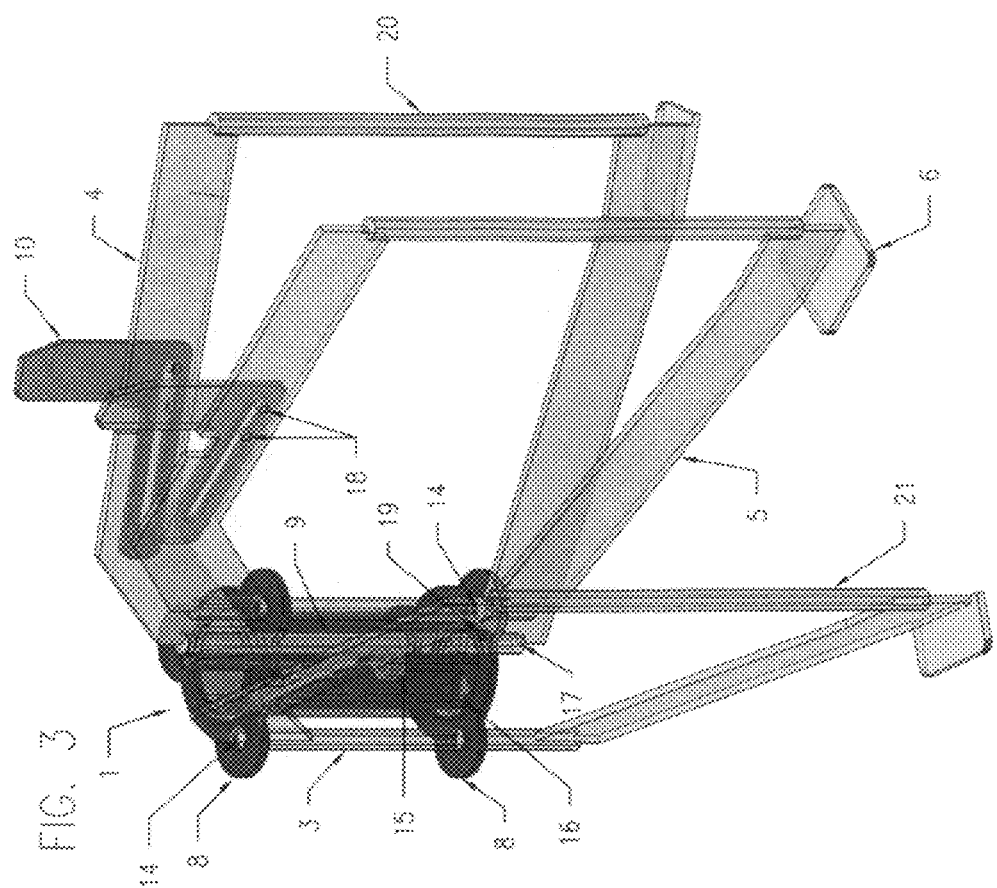
FIG. 3
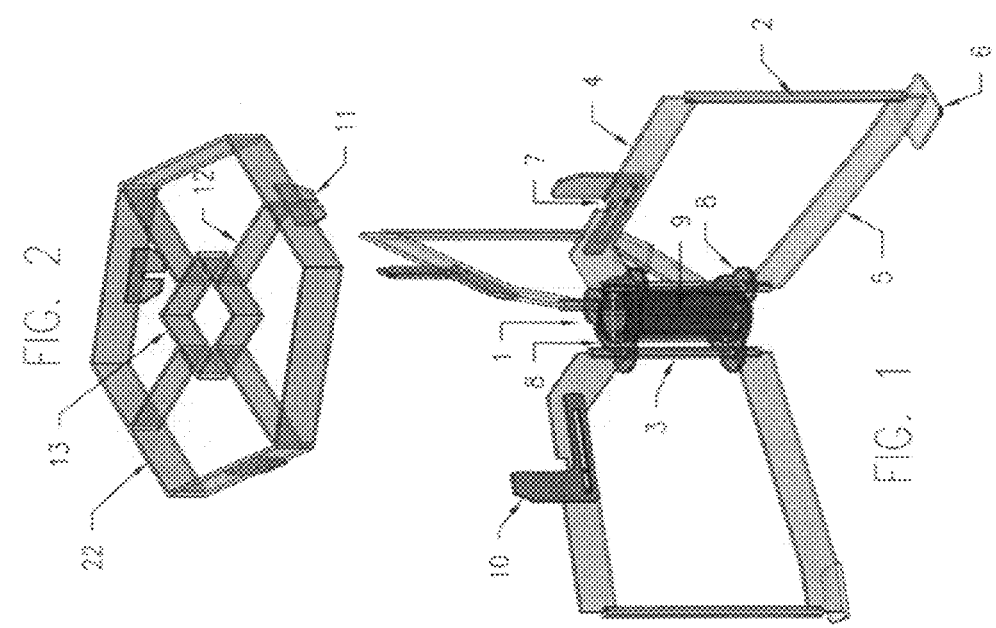
FIG. 2
FIG. 1

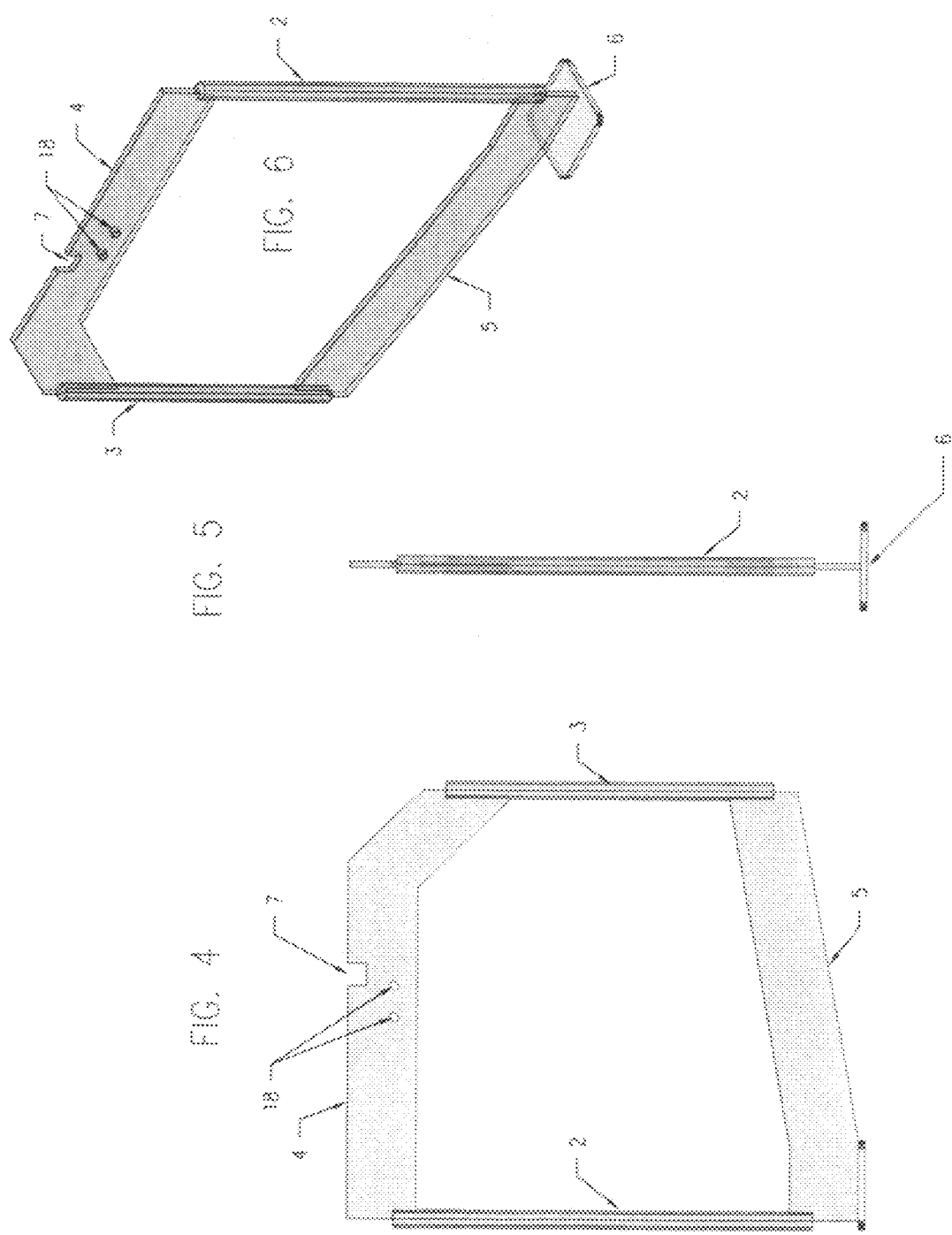

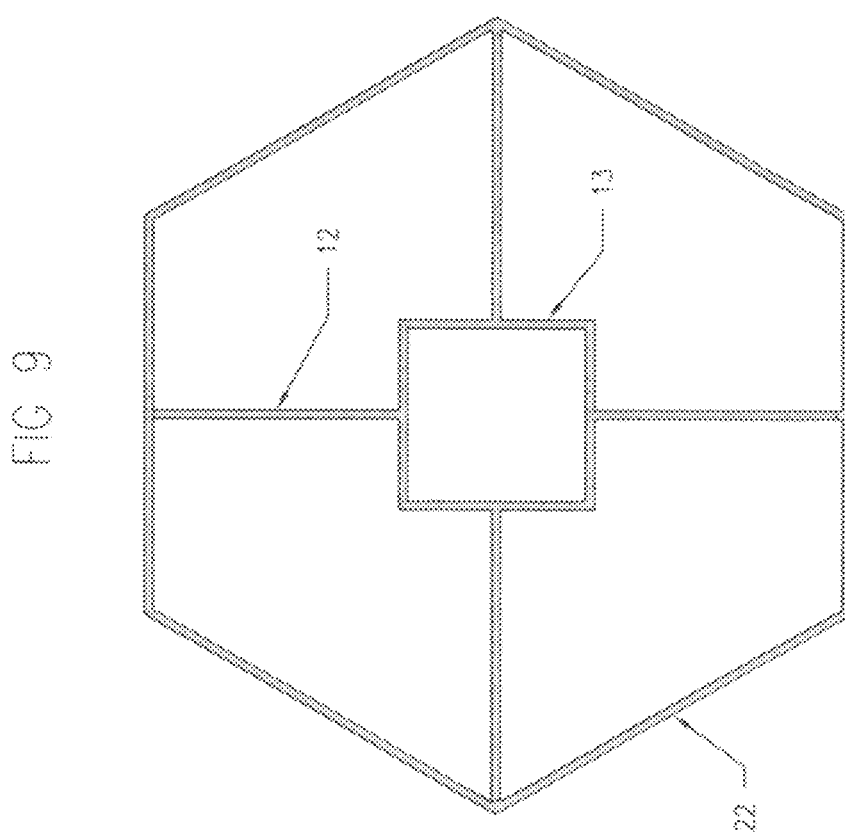

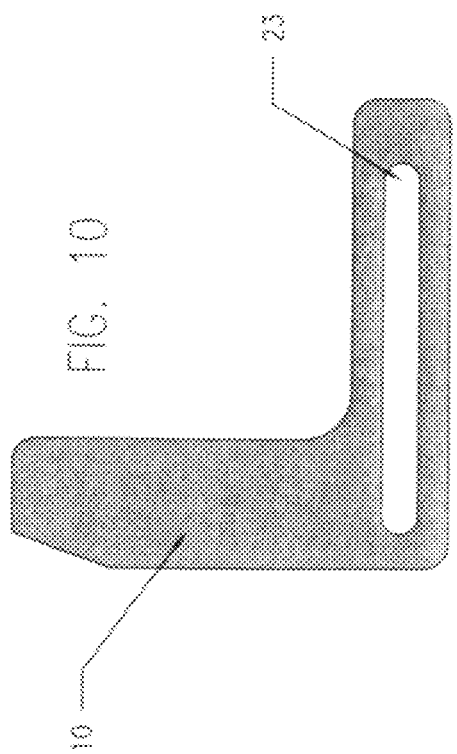

PROPANE SWIVEL BURNER

BACKGROUND OF THE INVENTION

1. Field of the Invention

The present invention relates to a propane swivel burner which is comprised of a pair swivel legs and a leg that is stationary allowing the burner to close in a swivel like motion, a hinge made of iron offers durability and stability to the legs of the burner, a grill/grid that provides safety slots that will allow cooking pot the ability to set atop of the burner more safely, a foot stand on the bottom of each leg to make the burner more stable, a cylinder pipe to house the cap orifice and direct the flame, a level that will allow variety size of cooking pans and/or pots to set atop the propane swivel propane burner.

2. Description of the Prior Art

Various types of portable burner stove, tripod burners and similar burners are known in the art.

Known prior art tripod and/or portable burners include U.S. Pat. No. 5,117,808 a folding burner apparatus which is characterized by three support legs, two of which legs are each provided with a compression leg fitting for pivotally mounting the support legs on a burner pipe in foldable relationship. Each of the leg fittings is further provided with a leg stop which contacts the burner pipe when the legs are deployed, to prevent the legs from folding excessively when the burner apparatus is oriented in functional configuration. The third leg is fixed to a leg collar which is rigidly attached to the burner pipe and serves to stabilize a gas inlet line which terminates inside the bottom area of the burner pipe. U.S. Pat. No. 5,423,308 dated Apr. 22, 1994 is a. This invention is to provide a camping stove which may uniformly provide heat to the food. In accordance with one aspect of the invention, there is provided a camping stove comprising a pair of bases pivotally coupled together, each of the bases including a bottom portion having a plurality of air holes formed therein and including two end portions, four ribs formed on the end portions of the bases, a pair of legs coupled to the bases for supporting the base, a burning device disposed in the bases, a pair of grates disposed in the bases and disposed above the burning device; and a pair of couplers each including a channel for engaging with the ribs of the bases so as to secure the bases together in parallel to each other, the bases being foldable together so as to form a compact configuration when the couplers are disengaged from the ribs. U.S. Pat. No. 5,884,553 dated Oct. 1, 1998 A foldable fuel cooker is provided including a central member and a plurality of legs pivotally connected to central member via pipes mounted thereon. An inlet tube is connected to the central member and extends therefrom to a central extent of one of the legs. A brace is mounted on one of the legs for preventing the inlet tube from being inadvertently removed. The general purpose of the present invention, which will be described subsequently in greater detail, is to provide a new folding propane cooker with inlet support brace apparatus and method which has many of the advantages of the burner tripods mentioned heretofore and many novel features that result in a new folding propane cooker with inlet support brace which is not anticipated, rendered obvious, suggested, or even implied by any of the prior art burner tripods, either alone or in any combination thereof.

The present propane swivel burner is a new improved burner. This present propane swivel 1 tries to address safety concerns, marketability, efficient manufacturing assembly, durability, and easier consumer usage. The above mentioned referenced prior known art present safety issues wherein the structures are assembled using multiple fittings which have to be tighten often to ensure stability. The gas flows through a compressed fixed leg and in other description mentioned the gas line is affixed to the one of the leg. The configuration of the gas line and both mentioned descriptions exposures the gas line to wear and tear in which a gas leakage can occur. The burner is place on rough surfaces which can cause the legs of the burner to be dented or punctured. The present invention of the propane swivel burner has a gas line that is welded to the plate. The plate will be discussed later. The plate is welded to the bottom of the cylinder pipe. The cylinder pipe sits above ground so that it is independent of the legs. The present propane swivel burner eliminated numerous fittings. The propane is without any fittings used in the construction of the legs of the propane swivel burner wherein the burner is more durable and sturdy and reduces the risk of leakages. The construction of the leg will be mention and shown an illustration later is more seamless.

The present propane swivel burner improves the usage of the burner during cooking. Slots are welded to the grill/grid. The grill/grid is made in a hexagon shape with braces connecting to a center that is a squared shaped. This was constructed in such a way to maintain the structural integrity of the grill/grid when exposed to heat. The grill/grid also has slots welded to it to connect to slots on the legs; wherein the grill/grid can be locked in place and the slots and gives direction of the placement for the legs. When the grill/grid is place in locked position with the legs and it further locks the legs and while in use. The slots on the legs and the slots on the grill/grid interlock with each other. The grill/grid construction of the invention also allows the cooking pots to sit firmly atop the burner during use. The above mention prior known art had the cooking pots sitting directly atop of the burner legs in which this presents hazardous implications. The present invention of the propane swivel burner decreases the risk of having a pot slide off of the burner.

A level a on each leg of the present invention that can be screwed onto the legs. The levels provide additional support for cooking pots. The levels can be adjusted for different pots sizes. The above mention prior known art does not have a level that can be adjusted for different pot sizes. The levels in the present invention can be removed and used as needed.

The present propane swivel burner improves the stability of the burner. The legs have foot stands welded to each leg. This construction offered added support to the propane swivel burner. The above mention prior known art does not have stability support.

It is important to mention that the present invention of the propane swivel burner has a heating generated seasoned coating to protect the burner from rust.

SUMMARY OF INVENTION

This is a propane swivel burner that is an improvement to the known types of tripod and/or portable burner. The present invention provides features that make the burner safe, durable, and sturdy, user friendly, portable, economical, functional, and marketable. The burner is supported by a pair legs. Two of the legs sit in a hinge that allows the legs to move in a swivel like motion. A leg in welded to the hinge so that the leg will remain stationary. This function causes the legs to close in either direction. There are three legs in total. A slot cut into it each leg at the top to keep the grill/grid locked into place and also to direct the configuration of the legs when in use. A level is attached to each leg using screws. This feature allows the usage of different size cooking pots to sit atop the grill/grid. The level can be removed and place back on if needed by simply screwing each level into place. The level has a slot cut out it to allow the level to move in a back in forward motion giving the level the ability to adjust or various pot sizes and support the pot in place. There are pre-drilled holes for the screws. A level is located on the on the top legs and it mounts on the side of each leg. A foot stand is welded to the bottom of each leg giving the legs additional stability. This construction prevents the burner from tilting over. A cylinder pipe houses a cap orifice. The cylinder pipe directs the flame and provides the appropriate airflow. The gas line is mounted to the bottom if the cylinder pipe instead of being attached to the leg. This will lessen the wear and tear of the gas line. In the prior known arts the gas line are attached to tubular legs wherein the gas flows directly through the leg or along the side of the leg. The legs or put under a lot of stress from standing on hard surfaces and they are exposed to elements that can puncture the tubular pipe, which can cause gas leaks. The present invention does not attach the gas line to the leg. A hinge is welded to the top and bottom of the cylinder pipe. The hinges outer exterior is made in a triangular shape and the inside of the hinge is circular so that is can sit around the cylinder pipe. This construction enable the hinge to remain in place and maintain it integrity. Unlike prior known art wherein the hinges are mounted to the sides of the cylinders and attached to the legs with couplets. That previous construction is not sturdy. The present invention of the propane swivel burner has a hinge that has three hole cut into it to allow the leg to sit inside the holes; which enable the burner to move in a swivel like motion to close. This construction makes the burner portable and compact.

BRIEF DESCRIPTION OF THE DRAWING

The invention can be understood by reference to the accompanying drawing, wherein:

FIG. 1 is an 3-dimensional view of a pair legs that swivel and a leg that is stationary in the deployed position, the cylinder illustrated in FIG. 7, a level illustrated in FIG. 10, the foot stand illustrated in FIG. 3, 5, and, a slot on the leg illustrated in FIGS. 3, 4, and 6, a slot for the level illustrated in FIGS. 3 and 10;

FIG. 2 is sectional side view of the grill/grid illustrated in FIG. 6 and the slots FIG. 3 is an 3-dimensional view of the preferred embodiment of the outdoor propane swivel burner of the this invention, illustrated a fixed leg and a pair of legs in a swivel motion to close; FIG. 3 is a top view of the hinge and a cap orifice housed inside a cylinder pipe illustrated in FIG. 7;

FIG. 4 is a side view of a leg, a slot, and a screw hole for a level illustrated in 1, 3, and 6;

FIG. 5 is a front view ide of a side bar illustrated in FIGS. 4, 6, 1, and 3, and a foot stand illustrated in FIGS. 1, 3, and 6

FIG. 6 is the side view of the foot stand illustrated, in FIGS. 1, 3, and 5; a slot illustrated in FIGS. 1, 3, and 4; FIG. 6 is a side view of screw holes for the level as illustrated in FIGS. 1,3, and 4;

FIG. 9 is the top view of the grill/grid;

FIG. 10 is the side view of a level and the level slot illustrated in FIGS. 1, and 3;

DESCRIPTION OF THE PREFERRED EMBODIMENTS

Figure 8:
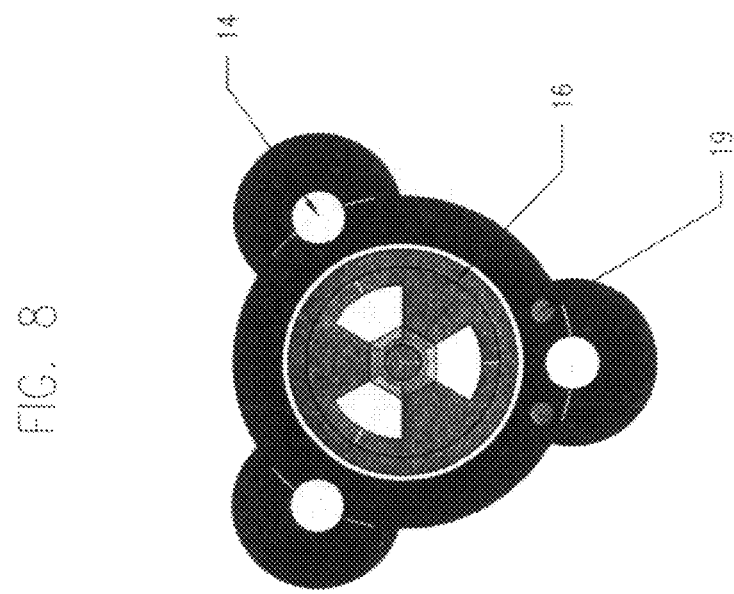
FIG. 8 is a above view of a hinge that has a plate for airflow attached to it as illustrated in FIG. 3.
Figure 7:
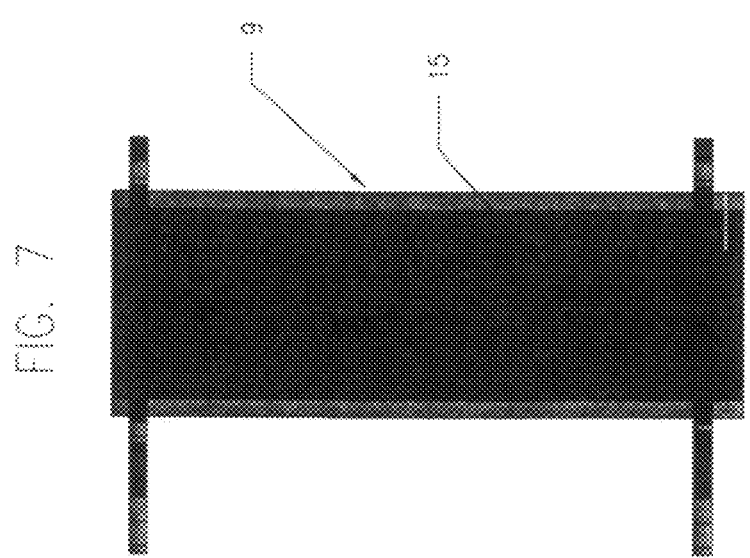
FIG. 7 is a sectional view of a cylinder pipe.

Referring to FIGS. 1-3 of the drawing, the propane swivel burner of this invention is generally referenced by numeral 1. The propane swivel burner 1 is characterized by a vertical cylindrical central member 9 made up of iron. Each end of the cylinder pipe 9 is open, with the bottom face of the cylinder 9 having a plate 16 for airflow screwed with two screws to it as illustrated in FIG. 3. The plate 16 has openings for proper air flow this aides the flame in receiving the appropriate ventilation. The plate 16 has a gas inlet line 17 welded to the plate 16. The inlet line 17 is tubular iron piece for gas flow. The gas inlet line and threaded to fit the flare orifice 17 and cap orifice 15 as illustrated in FIG. 3. This allows the flare orifice 17 to connect to gas hose (not illustrated). The gas hose can be purchase from any hardware store. The gas hose (not illustrated) connected to a propane gas allow the gas to flow to the gas inlet line 17 to ignite the flame (not illustrated). FIG. 3 illustrates the orifice cap 15 which is housed inside the cylinder pipe 9. The cylinder pipe 9 protects the cap orifice 15 from the elements. The cylinder pipe 9 also directs the flame.

FIGS. 1, 2 and 8 illustrate a pair of hinges 8 welding around the cylinder pipe 9 placed at both the top and bottom of the cylinder pipe 9. The hinges 8 as illustrated and FIGS. 1, 2 and 8 has holes 14 for each leg 20 to be inserted to form the structure of the propane swivel burner 1. The distance of the holes is important as it adds stability to the entire structure of the burner. As illustrated in FIG. 2 the hinges 8 aide the legs and deployment in the illustration in FIG. 3 this allows a pair of legs to move in a swivel like motion allowing the propane swivel burner 1 to close.

A pair of legs 20 is constructed from iron as illustrated in FIGS. 1, 3, 4, and 6. The legs 20 are made in a hexagon like shape. The top bar 4 of the leg 20 are made with flat iron at approximately 12 in. in length and the bottom bar 5 of the leg 20 are made on a slant approximately 10 in. in length. The top bar 4 and bottom bar 5 are a horizontal direction. The front side bar 2 and the back side bar 3 are made in a tubular iron and are in a vertical direction as illustrated in FIGS. 1, 3, 4, 5, and 6. The front side bar 2 is approximately 12 in. in length and the back side bar is approximately 10 in. in length as illustrated in FIG. 4. This construction was implemented to provide strength and stability to the function of the burner and to efficiently manufacture the propane swivel burner. Two of the legs 20 of the burner move in a swivel like motion allowing the propane burner to close as illustrated in FIG. 3; the pair of legs 20 sit free into the hole 14 of the hinge 8. A leg 21 also made from iron is welded to a hole in the hinge to remain stationary as illustrated in FIG. 3. This unique construction allows the burner to close making it easy to store and carry.

FIGS. 1, 3, 5, and 6 illustrate a foot stand that is made of iron and welded to each leg 20 and 21. The foot stand offer stability to the legs of the burner. This feature allows the burner to stand on several different surfaces during use and it also offers additional support to the structure of the entire burner. The foot stand is approximately 2 in. and size as illustrated in FIG. 6. This will address tipping accidents.

The present invention is an improve propane burner and/or tripod burner. This present propane swivel 1 tries to address safety concerns, marketability, efficient manufacturing assembly, durability, and easier consumer usage. FIG. 1, 3, 4, 6 illustrate a slot 7 on each leg 20 and 21. The slots 7 have been inserted at the top of each leg 20 and 21. The slots 7 have are welded to bottom of a grill/grid 22 as illustrated in FIG. 2. The slots 7 act as a locking mechanism for the grill/grid that is used with the propane swivel burner 1. The construction was added as a safety measure.

FIGS. 2 and 9 illustrated a grill/grid 22 is made from iron. The grill/grid 22 is made in a hexagon shape with braces 12 connecting to a center 13 that is squared shaped. This was constructed in such a way to maintain the structural integrity of the grill/grid 22 when exposed to heat. The grill/grid 22 also has slots 11 welded to it to connect to slots 7 on the legs 20 and 21, so that the grill/grid 22 can be locked in place and the slots 7 and 11 gives direction of the placement for the legs 20 and 21. When the grill/grid 22 is place in locked position with the legs 20 and 21 it further locks the legs 20 and 21 will and use. The slots 7 on the legs 20 and 21 and the slots 11 on the grill/grid 22 interlock with each other.

FIGS. 1, 3, and 10 illustrate a level 10 that can be adjusted to support the usage of pots. The level 10 is a removable feature for the propane swivel burner 1 and the level 10 can be attached to each leg 20 and 21. The level has a slot cut into it to allow the level to move in a back in forward motion giving the level the ability to adjust or various pot sizes and support the pot in place. The level 10 enables the operator of the propane swivel burner 1 to use different size pots. The level 7 can be added to the legs 20 and 21 by simply screwing them on to the legs 20 and 21. The holes 18 for the screws have been pre-drilled.

The foregoing is considered as illustrative only of the principles of the invention. Further, because is known that numerous modifications and changes will readily occur to those skilled in the art. This invention is not limited to the exact construction and operational functions described and shown through illustration. While all preferred embodiments of the invention have been described above, it should be dully noted and understood that multiple modification and improvements may be therein and the appended claims are shall be intended to cover all such modifications which may fall within the spirit and scope of the invention.

I claim:

1. A propane swivel burner structure for cooking and supporting heating contents of a cooking container, comprising:
   a burner including a welded cylinder pipe to direct a flame, said cylinder pipe defining a central longitudinal axis;
   three legs, a leg slot contained on each leg, a grill/grid is inserted into each said leg slot to provide stability for each of the three legs, the grill/grid is hexagonally shaped and contains a plurality of grill/grid slots which engage the leg slots of the three legs;
   a plurality of hinges that are welded to the cylinder pipe to support the three legs and allow at least two legs to move in a swivel motion about said central longitudinal axis, and one leg to remain stationary so that at least two legs can swivel towards the stationary leg, wherein each hinge comprises holes radially located a distance of 1.75 inches from said central longitudinal axis, the distance adds stability to the structure of the burner; and
   a plurality of adjustable levels positioned according to the size of the cooking container, and each level comprising a level slot, at least two screws are inserted into said level slot to fasten an adjustable level to a leg, the level can be adjusted after the at least two screws are loosened.

2. The propane swivel burner of claim 1, wherein the burner comprises a foot stand which is located on at least two of the legs.

* * * * *